(12) United States Patent
    Francois

(10) Patent No.: US 11,067,838 B2
(45) Date of Patent: Jul. 20, 2021

(54) EXTERNAL ELEMENT WITH TEMPERATURE SENSOR

(71) Applicant: The Swatch Group Research and Development Ltd, Marin (CH)

(72) Inventor: Nicolas Francois, Neuchatel (CH)

(73) Assignee: The Swatch Group Research and Development Ltd, Marin (CH)

( * ) Notice: Subject to any disclaimer, the term of this patent is extended or adjusted under 35 U.S.C. 154(b) by 93 days.

(21) Appl. No.: 15/766,163

(22) PCT Filed: Nov. 1, 2016

(86) PCT No.: PCT/EP2016/076302
    § 371 (c)(1),
    (2) Date: Apr. 5, 2018

(87) PCT Pub. No.: WO2017/092944
    PCT Pub. Date: Jun. 8, 2017

(65) Prior Publication Data
    US 2018/0284491 A1    Oct. 4, 2018

(30) Foreign Application Priority Data
    Nov. 30, 2015    (EP) .................................... 15197047

(51) Int. Cl.
    *G02F 1/01*    (2006.01)
    *B32B 27/20*    (2006.01)
    (Continued)

(52) U.S. Cl.
    CPC .............. *G02F 1/0147* (2013.01); *B32B 7/08* (2013.01); *B32B 7/12* (2013.01); *B32B 9/007* (2013.01);
    (Continued)

(58) Field of Classification Search
    CPC ..... G02F 1/0147; G02F 2201/50; B32B 7/08; B32B 7/12; B32B 9/007; B32B 9/045;
    (Continued)

(56) References Cited

U.S. PATENT DOCUMENTS 4,397,566 A * 8/1983 Lederrey ............ G04B 37/0008
                                                            368/276
5,430,692 A    7/1995 Grupp et al.
    (Continued)

FOREIGN PATENT DOCUMENTS

| CN | 102695388 A | 9/2012 |
| CN | 107790021 A | 4/2015 |
| WO | 01/02168 A1 | 1/2001 |

OTHER PUBLICATIONS

International Search Report dated Jan. 23, 2017 in PCT/EP2016/076302 filed Nov. 1, 2016.
(Continued)

*Primary Examiner* — Marin Pichler
*Assistant Examiner* — Mitchell T Oestreich
(74) *Attorney, Agent, or Firm* — Oblon, McClelland, Maier & Neustadt, L.L.P.

(57) ABSTRACT

A thermochromic element including a thermochromic layer including a binder and a thermochromic pigment chosen to react at a specific temperature so that the pigment passes from a first color to a second color when the specific temperature is reached. The thermochromic layer coats a thermally conductive layer, and is protected by an optically transparent layer that protects it from chemical and physical degradation.

16 Claims, 4 Drawing Sheets

(51) Int. Cl.
| | |
|---|---|
| *C09K 9/02* | (2006.01) |
| *B32B 9/04* | (2006.01) |
| *G04B 47/00* | (2006.01) |
| *B32B 27/28* | (2006.01) |
| *B32B 15/082* | (2006.01) |
| *G04B 45/00* | (2006.01) |
| *B32B 27/30* | (2006.01) |
| *B32B 9/00* | (2006.01) |
| *B32B 27/40* | (2006.01) |
| *B32B 7/12* | (2006.01) |
| *B32B 7/08* | (2019.01) |
| *B32B 15/20* | (2006.01) |
| *B32B 15/095* | (2006.01) |
| *B32B 15/08* | (2006.01) |
| *G04B 47/06* | (2006.01) |

(52) U.S. Cl.
CPC .............. *B32B 9/045* (2013.01); *B32B 15/08* (2013.01); *B32B 15/082* (2013.01); *B32B 15/095* (2013.01); *B32B 15/20* (2013.01); *B32B 27/20* (2013.01); *B32B 27/283* (2013.01); *B32B 27/308* (2013.01); *B32B 27/40* (2013.01); *C09K 9/02* (2013.01); *G04B 45/0015* (2013.01); *G04B 47/008* (2013.01); *G04B 47/068* (2013.01); *B32B 2250/44* (2013.01); *B32B 2255/26* (2013.01); *B32B 2307/30* (2013.01); *B32B 2307/302* (2013.01); *B32B 2307/4026* (2013.01); *B32B 2307/412* (2013.01); *B32B 2307/422* (2013.01); *B32B 2307/584* (2013.01); *B32B 2307/71* (2013.01); *B32B 2451/00* (2013.01); *G02F 2201/50* (2013.01)

(58) Field of Classification Search
CPC ..... B32B 15/08; B32B 15/082; B32B 15/095; B32B 15/20; B32B 27/20; B32B 27/283; B32B 27/308; B32B 27/40; B32B 2250/44; B32B 2255/26; B32B 2307/30; B32B 2307/302; B32B 2307/4026; B32B 2307/412; B32B 2307/422; B32B 2307/584; B32B 2307/71; B32B 2451/00; C09K 9/02; G04B 45/0015; G04B 47/008; G04B 47/068
USPC ........................................................ 359/288
See application file for complete search history.

(56) References Cited

U.S. PATENT DOCUMENTS

| | | | | |
|---|---|---|---|---|
| 5,484,205 | A | * | 1/1996 | Grupp ..................... G01K 1/02 368/11 |
| 5,688,592 | A | | 11/1997 | Shibahashi et al. |
| 5,972,526 | A | * | 10/1999 | Matsumoto ............. C23C 14/16 428/644 |
| 2012/0045952 | A1 | | 2/2012 | Chen |
| 2012/0049139 | A1 | * | 3/2012 | Ono .................... C09B 67/0097 252/583 |

OTHER PUBLICATIONS

Chinese Office Action issued in Chinese Patent Application No. 201680069668.9 dated Sep. 2, 2020, (w/ English Translation).

* cited by examiner

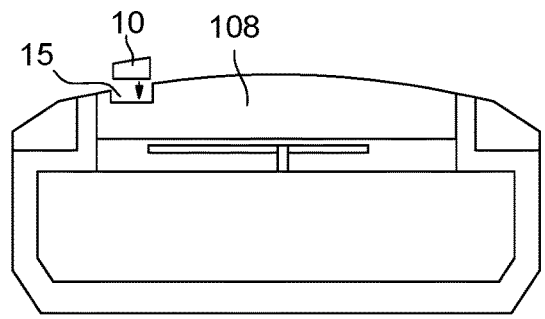
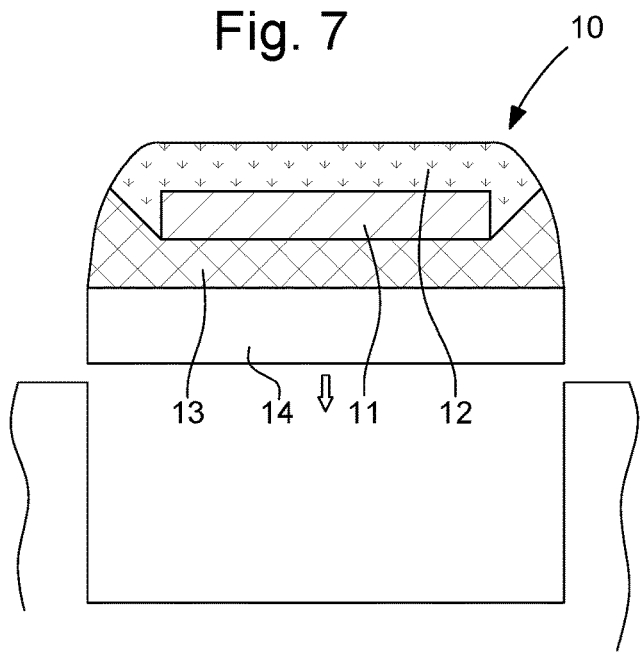
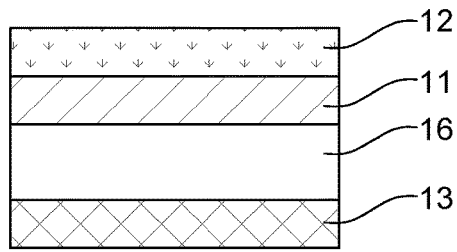
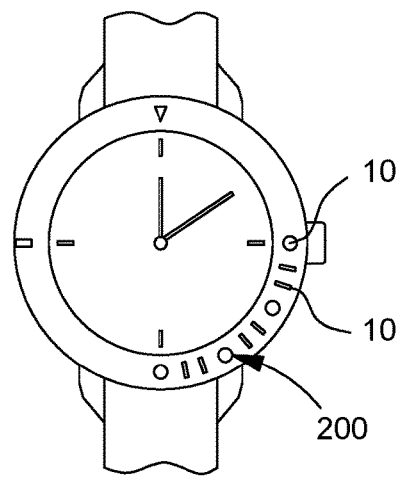
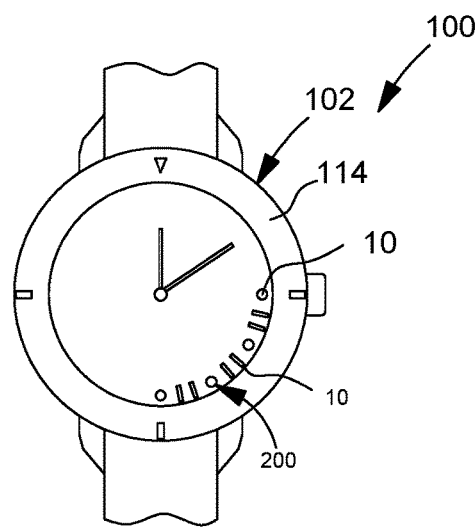

EXTERNAL ELEMENT WITH TEMPERATURE SENSOR

CROSS-REFERENCE TO RELATED APPLICATIONS

This is a National phase Application in the United States of International patent Application PCT/EP2016/076302 of Nov. 1, 2016 which claims priority of European patent application No. 15197047.2 of Nov. 30, 2015. The entire disclosure of the above patent applications are hereby incorporated by reference.

The present invention relates to a thermochromic element comprising a thermochromic layer that is composed of a binder and a thermochromic pigment that is chosen to react at a specific temperature so that said pigment passes from a first color to a second color when said specific temperature is reached.

TECHNOLOGICAL BACKGROUND

Wearable objects, such as straps, that use thermochromic pigments for temperature-sensor type applications or purely decorative applications are known. One technology that is used is the Leuco technology. The mechanism of Leuco systems is now well-known and is widely used in inks and paints but also in the bulk of plastics; the pigment is in fact a micro-capsule containing three compounds: a dye that is sensitive to changes in pH (iono-chromism), generally chosen from the spironolactone class; a weak acid that acts as the color developer—it is generally a question of bisphenol A; and a co-solvent chosen from the class of fatty acids of low melting point, amides or alcohols.

It is the melting point of the co-solvent that determines the threshold of transition from the colored form to the colorless form of the dye.

One drawback of this system is its high sensitivity to ultraviolet (UV) radiation, which leads to rapid degradation of the pigment if it is exposed to ultraviolet radiation for longer than a few tens of hours without interruption.

To solve this problem, it has been envisioned to use additives that slow the degradation of the dye under ultraviolet, additives such as ultraviolet absorbers based on oxides of titanium, of cerium or of zinc being known, and it is accepted that such known absorbers may be used in the formulations of paint or of thermochromic inks.

Nevertheless, the drawback of these ultraviolet absorbers is that they have a high refractive index and therefore a high light-scattering coefficient, resulting in the system being opacified.

One known variant is the use of submicron-sized particles, goods dispersion of the latter allowing an improvement in optical qualities to be achieved.

Another alternative is the use of organic particles of the phenolic type such as hydroxybenzophenone or lignin.

The use of all these additives complexifies the formulation and hinders the achievement of a good result that is functional, aesthetic and resistant.

A last alternative consists in using nanoparticles composed of spin-transition complexes. The thermochromic effect of these nanoparticles is described in patent application US2008/0311401. They in addition have a good stability under ultraviolet. Certain nanoparticles however have, depending on the complexes used, the drawback of a relatively large memory effect, this preventing, in a temperature-sensor application, a reliable indication of temperature from being achieved.

SUMMARY OF THE INVENTION

The invention relates to an external element that mitigates the aforementioned drawbacks of the prior art by providing a wearable object capable of delivering legibly and reliably an indication of changes in temperature.

To this end, the invention consists of a thermochromic element that comprises a thermochromic layer that is composed of a binder and of a thermochromic pigment that is chosen to react at a specific temperature so that said pigment passes from a first color to a second color when said specific temperature is reached, characterized in that the thermochromic element furthermore comprises a carrier layer on which the thermochromic layer is deposited and a protective layer that is resistant to ultraviolet radiation and that covers the thermochromic layer and the carrier layer.

This invention allows a thermochromic layer to be obtained that, while being protected from UV by the protective layer, still has, via the carrier layer, a good reactivity to changes in temperature.

In a first advantageous embodiment, the carrier layer has a thermal conductivity higher than 100 $W \cdot m^{-1} \cdot K^{-1}$. This layer allows, with regard to the color change when the temperature varies, a good reactivity to be achieved.

In a second advantageous embodiment, the thermochromic layer is a hard lacquer consisting of: a binder with which the pigment is mixed, this binder being chosen from the family of the acrylics, of the acrylic copolymers or of the polyurethanes; a dispersant of the polycarboxylic-acid-salt type; a Plasticizer of the benzoate type; and a solvent chosen from the family of the glycols or esters.

In a third advantageous embodiment, the thermochromic layer is a soft lacquer consisting of a binder with which the pigment is mixed, said binder being chosen from the family of the silicones or of the polyurethanes.

In a fourth advantageous embodiment, the thermochromic layer is an ink consisting of a binder chosen from the family of the acrylics or of the polyurethanes or of the silicones, of a dispersant or defloculator of the polycarboxylic-acid-salt type, of a Plasticizer and adhesion promoter of sulfonamide type and of a solvent chosen from the family of the glycols or esters.

In a fifth advantageous embodiment, the protective layer is chosen from the list comprising: sapphire, acrylic filled with nanodiamonds and graphene in the form of a lacquer inter alia, a thin nanodiamond layer, and an acrylic lacquer filled with nanodiamond and graphene fillers.

In another advantageous embodiment, the protective layer has a thermal conductivity at least higher than 10 $W \cdot m^{-1} \cdot K^{-1}$.

In another advantageous embodiment, the carrier layer is made from a material (taking the form of a thin layer, of sheets or in bulk form) chosen from the list comprising: anodised aluminium, copper, gold alloys, silver alloys, aluminium/silicon carbide alloys, thin layers of nanodiamonds, thin layers of graphite, and graphene.

In another advantageous embodiment, the thermochromic element furthermore comprises a substrate on which the various layers are placed in order to form an insert.

In another advantageous embodiment, the thermochromic element furthermore comprises at least one intermediate layer arranged under the thermochromic layer.

The invention also relates to an external element of a wearable object comprising a supporting structure made of a first material, said external element furthermore comprising at least one device that reacts to temperature variations, characterised in that said device that reacts to temperature variations is formed from at least one thermochromic element according to the invention.

In another advantageous embodiment, the device that reacts to temperature variations is a temperature sensor equipped with a plurality of thermochromic elements, each thermochromic elements reacting to a specific temperature that is specific thereto.

In another advantageous embodiment, the thermochromic elements all have the same first color.

In another advantageous embodiment, the thermochromic elements all have the same second color.

In another advantageous embodiment, the thermochromic elements are designed so that their second color allows a gradation when they have all passed from the first color to the second color.

In another advantageous embodiment, the external element comprises at least one recess arranged so that at least one thermochromic element can be placed therein.

The invention furthermore relates to a wearable object comprising a case formed by a middle closed by a back and a glass, said wearable object also comprising a strap, characterised in that it furthermore comprises at least one external element according to the invention, said external element being chosen from the list comprising the middle, the glass, the bezel, the dial, the strap, and the clasp.

BRIEF DESCRIPTION OF THE FIGURES

The advantages of such an external element will become clearly apparent on reading the following description and on examining the drawings that illustrate it by way of example, in which drawings:

FIG. 6 schematically shows a second implementation according to the present invention;

FIG. 7 schematically shows a variant of the first implementation of the thermochromic element according to the present invention;

FIG. 8 schematically shows a variant of the second implementation of the thermochromic element according to the present invention;

FIGS. 9 to 16 show a temperature sensor and its variants using the thermochromic element according to the present invention.

DETAILED DESCRIPTION

The present invention relates to an external element 1 of a timepiece or watch 100.

Figure 1:
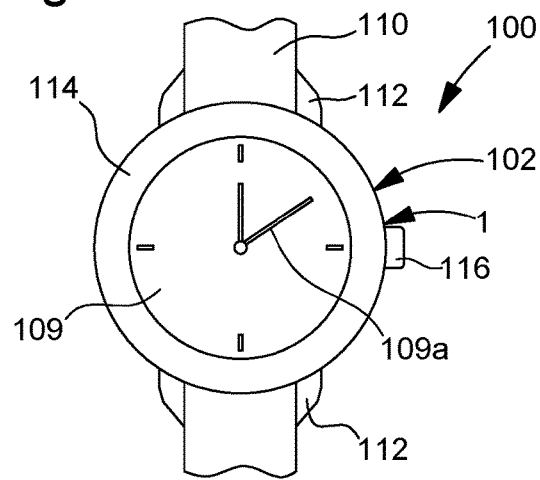
FIGS. 1 and 2 schematically show a timepiece according to the present invention.
Figure 2:
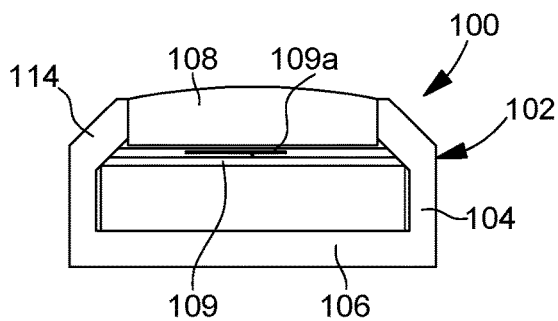

The timepiece 100 shown in FIGS. 1 and 2 is, for example, a wrist watch and comprises a case 102. This case is formed by a middle 104 closed by a back 106 and a glass 108 or even a bezel 114. The timepiece may comprise a dial 109 and displaying means 109a. The time piece also comprises controlling means 116. The timepiece also comprises a strap 110. The latter is fastened to the middle via two pairs of horns 112. The strap may consist of two lengths, each length being fastened with one pair of horns and connected to the other length by a clasp.

The external element may for example be a strap 110, a middle 104, a bezel 114, a glass 108, a button or a crown 116, or a dial 109 of the timepiece. The external element may be made from a metal or a ceramic or a plastic.

The external element 1 is arranged to bear a thermochromic element 10. Such a thermochromic element 10 is an element that is able to change color as a function of temperature. A thermochromic element 10 in general comprises a thermochromic pigment that reacts to temperature in such a way as to see its color modified.

Figure 3:
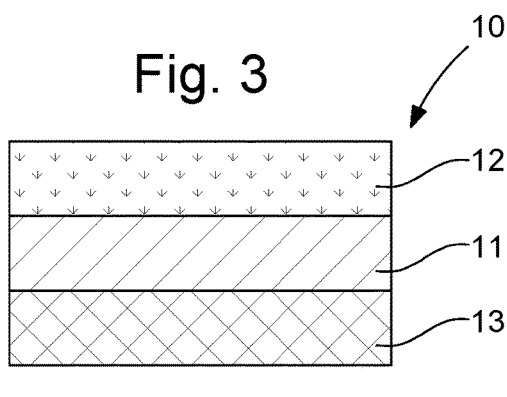
FIGS. 3 and 4 schematically show a thermochromic element according to the present invention.
Figure 4:
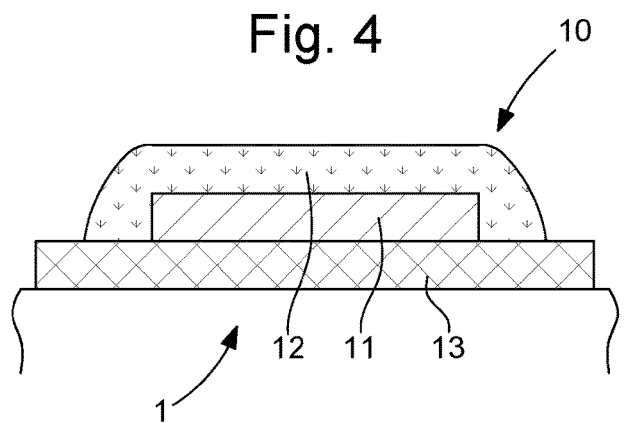

Advantageously according to the invention, the thermochromic element 10 is composed of at least three different components, taking the form of layers and superposed on one another as shown in FIGS. 3 and 4. These at least three components are used in order to obtain a highly effective thermochromic element with a long lifetime.

The first component is a component, referred to as component A, that is characterised by the fact that it takes the form of a thermochromic layer 11. This thermochromic layer is composed of thermochromic pigments such as the pigments called leuco pigments, i.e. microcapsules containing: a dye that is sensitive to changes in pH (iono-chromism), generally chosen from the spironolactone class; a weak acid that acts as the color developer—it is generally a question of bisphenol A; and a co-solvent chosen from the class of fatty acids of low melting point, generally amides or alcohols.

It will also possibly be a question of a pigment using a spin-transition technology.

The second component is a component, referred to as component B, which is characterised by the fact that it is a protective layer 12. Such a protective layer 12 consists in a layer that is resistant at least to ultraviolet radiation. This layer, which is transparent, may be a layer made from acrylic filled with nanodiamonds and/or graphene, and which has a good transparency and an improved thermal conductivity, or a thin nanodiamond layer.

Preferably, this layer of component B has a thermal conductivity higher than $10 \, W \cdot m^{-1} \cdot K^{-1}$.

The thickness of this layer of component B varies between 10 μm and 0.1 mm.

This advantageous arrangement allows the component A, i.e. the component comprising the thermochromic pigment, to be protected from ultraviolet radiation, and therefore the longevity of the thermochromic element to be increased since the layer of component B will absorb the ultraviolet radiation to some extent.

The third component, which is referred to as component C, takes the form of a carrier layer 13 having a thermal conductivity at least higher than $100 \, W \cdot m^{-1} \cdot K^{-1}$. The carrier layer 13 formed by this component is then deposited between the external element 1 and the layer 11 of component A containing the thermochromic pigments, the component A being covered by the component B. It will be noted that the film formed by this layer C has an area that is slightly larger than those of the films formed by the components A and B, in order to ensure the conductive layer makes direct contact with the exterior medium and is able to conduct, with the highest possible effectiveness, any temperature variations seen.

This component C may be chosen to be transparent or opaque depending on the material of the external element. Specifically, for an external element such as a glass, i.e. one that is transparent, a component C that is transparent will be used.

For this component C, a material from the following list will be chosen: anodised aluminium, gold, silver or one of the alloys thereof, and a thin layer of nanodiamonds that is for example deposited using a sol-gel process.

The thickness of this layer 13 of component C varies between 10 μm and 5 mm so as to allow a relatively large amount of energy to be transmitted and/or this energy to be transmitted relatively rapidly.

This layer 13, which is made of the material of component C, is used to thermally conduct heat from the external element and therefore to allow a good reactivity in the color change of the thermochromic element of layer A to be achieved.

Figure 5:
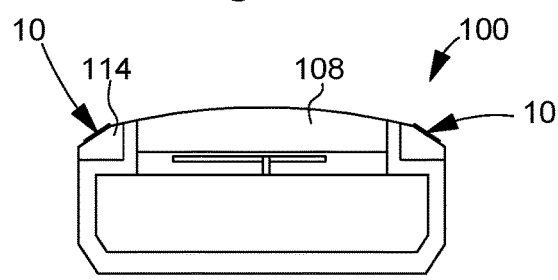
FIG. 5 schematically shows a first implementation according to the present invention.

In a first implementation, the thermochromic element 10 is produced by superposing layers. To do this, the various layers 11, 12, 13 of the respective components A, B and C take the form of layers of thickness from 10 to 100 μm, the thermochromic element then taking the form of a screen-printed print as shown in FIG. 5.

In this context, the layer of component A, which is the layer containing the thermochromic pigments, may be a layer that is uniformly deposited by spraying or dip coating or screen printing or using a stamp.

The layer of component B, which is the protective layer, is a layer deposited, using screen-printing methods, or using a stamp, or using spraying or dip-coating methods, to obtain a uniform layer. In a first form, the layer of component B will be of the hard-lacquer type and will consist of: a binder with which the anti-UV agents and other additives are mixed, this binder possibly being selected from the family of the acrylics or of the acrylic copolymers for a high resistance to radiation and to UV, or being a polyurethane binder for a high abrasion resistance; a dispersant of the polycarboxylic-acid-salt type; a Plasticizer of the benzoate type; a solvent of the glycol or ester type; and other additives such as anti-UV agents for the polyurethane in order to avoid degradation of the polymer, or feel agents (waxes, paraffin waxes, etc.) allowing the haptic properties of the component to be improved.

In a second form, the layer of component B will be of the soft-lacquer type and will consist of a binder with which the anti-UV agents and other additives are mixed. This binder may be selected from the family of the silicones or of the polyurethanes.

In a third form, the layer of component B will be of the ink type and will consist: of a binder from the family of the acrylics for a high resistance to UV and a high transparency or from the family of the polyurethanes for a high abrasion resistance or even a silicone ink for flexible substrates; of a dispersant or defloculator of the polycarboxylic-acid-salt type; of a Plasticizer and adhesion promoter of sulfonamide type; and of a solvent of glycol or ester type.

The layer of component C, which is the layer allowing a better thermal conductivity to be achieved, may be a thin layer of nanodiamonds deposited using a sol-gel process; or a thin layer of copper, gold or silver, carbon or similar deposited using a PVD ou PECVD process.

In a second implementation, the thermochromic element 10 is produced by superposing layers to form a disc-shaped insert as may be seen in FIG. 6. To do this, the various layers of the components A and B take the form of what are called thick layers, i.e. the layers are self bearing, in contrast to inks and laqueurs which must be deposited on a substrate. The layer C will possibly be thick or thin.

In this context, the layer of component A then takes the form of a soft or hard material. It is joined to the other layers by over-moulding, adhesive bonding, riveting, screwing or any other mechanico-chemical means. It is produced by injection moulding or over-moulding. The layer may be a thermoplastic (such as, for example, a resin of the acrylonitrile-butadiene-styrene, polyamide or polymethyl-methacrylate type) a thermoset (such as an acrylic or epoxy resin) or a thermoplastic elastomer (such as, for example, a resin of polyurethane type). This resin will, beforehand, be mixed: with the thermochromic pigments; with a compatible dispersant of the modified/graft copolymer type; and with a Plasticizer of benzoate or sulfonamide type.

The layer may also be made, by injection over-moulding or compression moulding, of a vulcanized rubber such as, for example, an elastomer resin of nitrile-butadiene or hydrogenated-nitrile-butadiene or fluoropolymer-elastomer type, or silicone, the vulcanization process used being adapted to the selected resin and using additional elements such as sulfur and vulcanization accelerators such as thiurams or peroxides and derivatives thereof, and, optionally, coupling agents (of the silane type).

Regarding the layer of component C, it may be envisioned that it take the form of a metal alloy of high thermal conductivity (copper alloy for example). In this case, this component C will be joined to the other layers. It may also be envisioned that the component C be produced by plasma processing on lower and longitudinal surfaces.

One advantage of this implementation is that it allows thermochromic elements that may be machined to the final shape of the temperature sensor to be obtained. They are easily handlable and may be joined to the parts to which they are to be added.

This implementation may be associated with recesses 15 arranged in the external element 10, these recesses 15 serving to house thermochromic elements 10 taking the form of inserts.

In one variant of the first implementation, provision may be made for the various layers of the thermochromic element to be deposited on a carrier 14, as shown in FIG. 7, this carrier 14 then being placed in a recess of the external element serving by way of housing.

In one variant of the first and second implementations, it may be envisioned for the thermochromic element to be composed of a mixture of thin layers and thick layers. In this context, it is possible for the layers of component A and of component C to be what are called thick layers. This configuration allows the layers of components A and C to form a sort of shell enclosing the thermochromic component.

Another example consists in having the layer of component C take the form of a thick layer on which the layers of component A and of component B are arranged. These layers of component B and of component A are what are called thin layers. This allows a thermochromic element that is easier to handle than a thermochromic element produced solely with thin layers to be obtained.

In one variant of the first and second implementations, provision may be made for the at least one intermediate layer 16 to be arranged between the layer of component A and the layer of component C, as shown in FIG. 8. Such a layer 16 may be used to obtain an additional effect. One advantageous example is the use of a luminescent, phosphorescent or fluorescent layer to obtain legibility in case of low light levels.

Of course, provision may be made for other types of intermediate layers (such as a metallized, colored or mother-of-pearl layer) in order to achieve an additional effect.

This thermochromic element 10 is then used in various applications. A first application consists in a temperature sensor 200 that allows a temperature scale to be viewed. In this application, the temperature sensor 200 comprises a plurality of thermochromic elements 10, each thereof comprising a pigment that reacts at a specific temperature. Therefore, each thermochromic element 10 changes color when a specific temperature is reached.

To obtain a temperature scale, provision will be made for the specific temperatures of the thermochromic elements 10 to increase or decrease from one element to the next. Thus, when the user wearing the wearable object experiences a change in temperature, the thermochromic elements 10 change color in response to this temperature change, allowing a visual indication that is simple to interpret to be obtained. These thermochromic elements 10 may be placed right next to one another or be spaced apart.

In one preferred variant, the first color of all the various thermochromic elements 10 composing the temperature scale, i.e. the color they have at rest, is identical. By this what is meant is that at a reference temperature all the thermochromic elements 10 have the same color.

In another preferred variant, the second color of the various thermochromic elements 10 composing the temperature scale, i.e. the color that they have when their specific threshold is reached, is identical. By this what is meant is that at the maximum measurable temperature all the thermochromic elements 10 will have the same color.

In another preferred variant, the various thermochromic elements 10 composing the temperature scale all have the same first color but are produced so that they do not all have the same second color in order to allow a gradation. More precisely, the thermochromic elements 10 are designed so that, when they form a temperature scale, the thermochromic elements that change color first have a lighter second color than the thermochromic elements 10 that change color last. For example, the first thermochromic elements 10 become yellow and the last become red. This makes a two-fold indication possible: not only does the user know that temperature is increasing because the number of thermochromic elements 10 that have changed color is increasing but he also knows that he is getting close to a maximum temperature because the color of the elements has changed and become darker.

It will therefore be understood that here the thermochromic pigment is of the reversible type. This means that when the pigment reaches or exceeds a specific temperature threshold, it changes color, passing from a first color to a second color. However, this also means that when the temperature drops below the specific threshold, the pigment passes back from the second color to the first color.

Provision will possibly be made for the thermochromic elements of the temperature sensor to be arranged on the bezel or glass of the watch and to extend over the bezel in a circular arc running from the 3 o'clock position of the hour-circle to the 6 o'clock position of the hour-circle or the 9 o'clock position of the hour-circle to the 12 o'clock position of the hour-circle, as shown in FIGS. 9 and 10.

Figure 11:
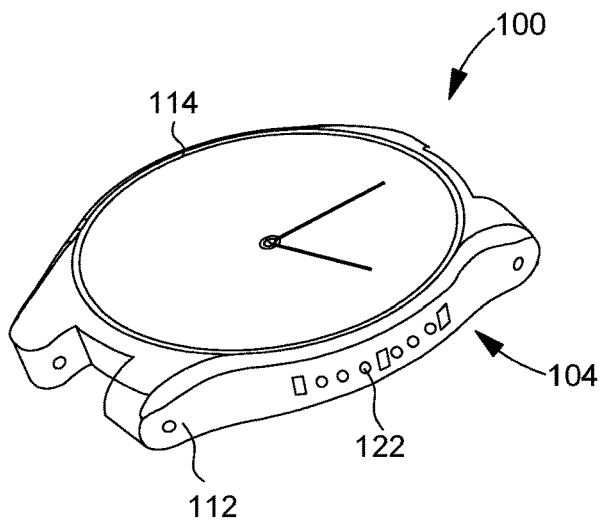

It is also possible for the temperature sensor to extend over the middle as shown in FIG. 11 or the strap of the watch as shown in FIGS. 12 to 16.

Figure 12:
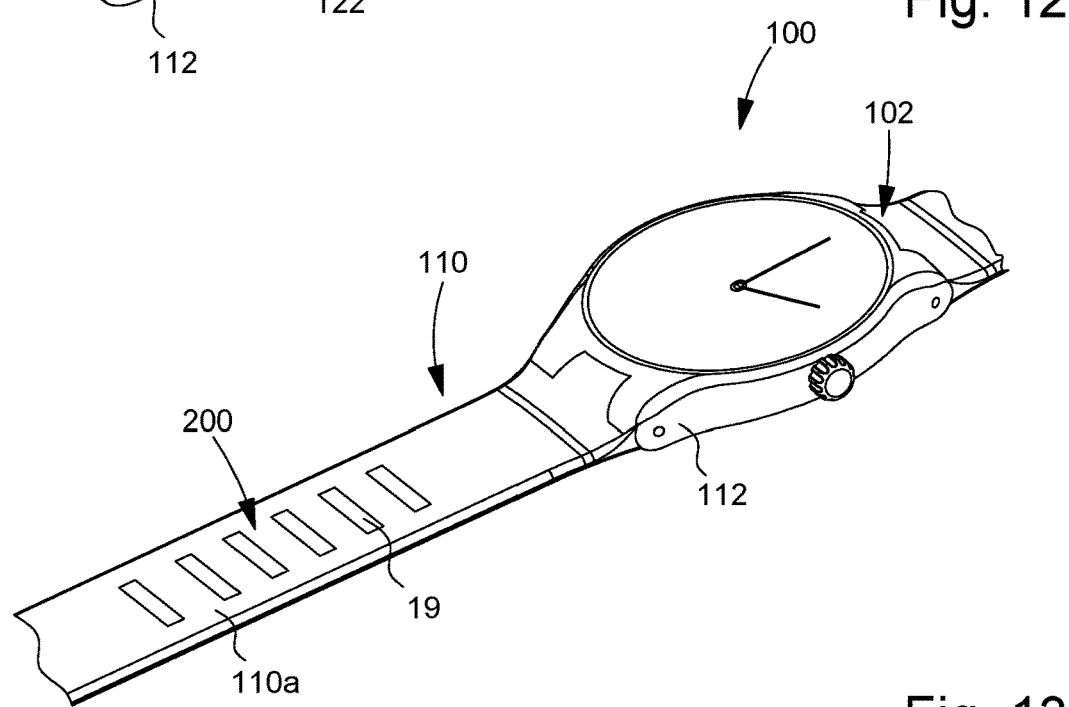

In a first case, shown in FIG. 12, the strap 110 is made up of two lengths 110a of strap, each length being fastened to a pair of horns 112 and connected to the other length via a clasp 111. Preferably, the lengths 110a of strap are made of rubber or plastic.

Figure 13:
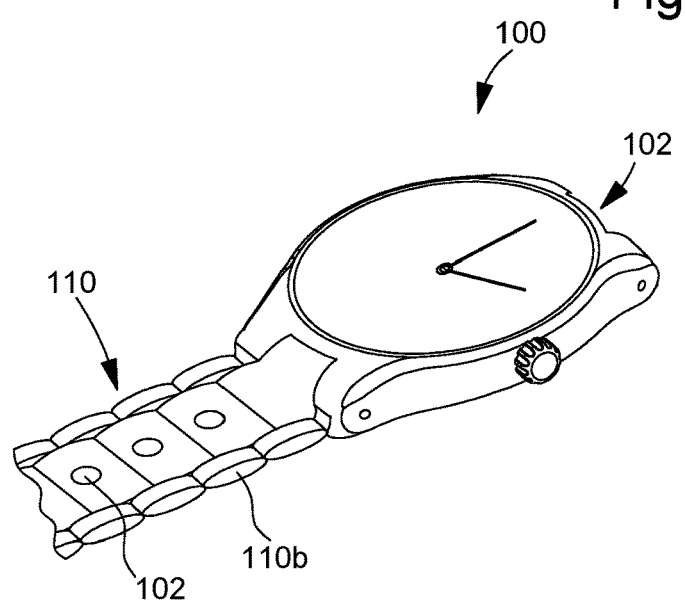

In a second case, shown in FIG. 13, the strap is made of metal or of ceramic and is then made up of a plurality of links 110b that are attached to one another by way of pins. This allows links 110b that may pivot with respect to one another to be obtained.

In both cases, the thermochromic elements may be screen-printed or take the form of inserts and be arranged in recesses in the strap.

Figure 14:
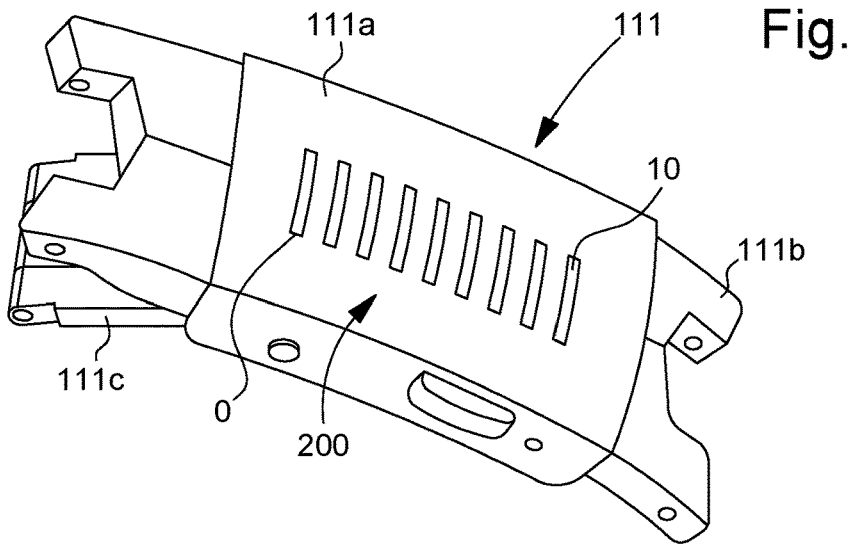
Figure 15:
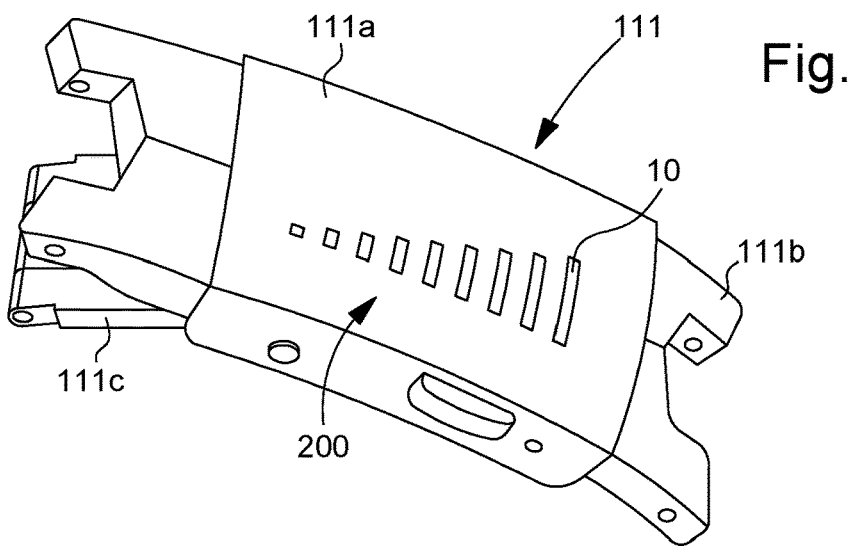
Figure 16:
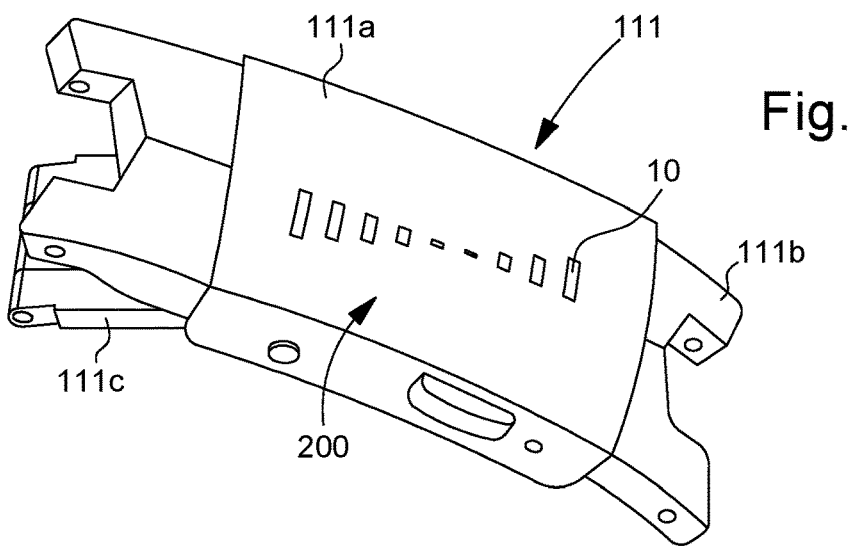

In another case, shown in FIGS. 14 to 16, the external element is the clasp 111, i.e. the deployment buckle of the strap. Such a deployment buckle is generally composed of three portions 111a, 111b, 111c such as extenders that are hinged with respect to one another. Two of these portions are fixed to one link or to one length. These portions from which the deployment buckle 111 is made are then designed to hinge so that they can fold on to one another, these three portions 111a, 111b, 111c then uniting into one. This configuration allows the length of the strap to be increased briefly with regard to fastening the watch to the wrist of the user.

For certain models of deployment buckle, one of the portions plays the role of a main part 111a because it is this portion that receives the two other portions 111b, 111c; this so-called main portion 111a is the portion visible from the exterior. From the exterior, the user therefore sees a portion taking the form of a metal plate on which indications such as the name of the brand may be engraved.

The present invention uses this surface to bear the temperature sensor. The thermochromic elements 1 are therefore placed on this surface of the central portion 111a of the deployment buckle.

It will be understood that various modifications and/or improvements and/or combinations that are obvious to those skilled in the art may be made to the various embodiments of the invention described above without departing from the scope of the invention defined by the appended claims.

The invention claimed is:
1. An external element of a timepiece comprising:
a supporting structure made of a first material;
at least one device that reacts to temperature variations, wherein the device that reacts to temperature variations includes at least one thermochromic element that includes a thermochromic layer that includes a binder and a thermochromic pigment chosen to react at a specific temperature so that the pigment passes from a first color to a second color when the specific temperature is reached;
wherein the thermochromic element further includes a carrier layer having an upper surface on which the thermochromic layer is deposited and a protective layer that is resistant to ultraviolet radiation,
wherein the protective layer covers and is in direct physical contact with each of a top surface of the thermochromic layer and a side surface of the thermochromic layer,
wherein a portion of the protective layer is deposited directly on the upper surface of the carrier layer to be in direct physical contact with the upper surface of the carrier layer, and
wherein an area of the entire upper surface of the carrier layer is larger than an area of the entire surfaces of the thermochromic layer and protective layer deposited thereon.
2. The external element as claimed in claim 1, wherein the thermochromic layer is a lacquer consisting of: a binder with which the pigment is mixed, the binder being chosen from the family of acrylics, of acrylic copolymers or of polyurethanes;

a dispersant of polycarboxylic-acid-salt type; a Plasticizer of benzoate type; and a solvent chosen from the family of glycols or esters.

3. The external element as claimed in claim 1, wherein the thermochromic layer is a lacquer consisting of a binder with which the pigment is mixed, the binder being chosen from the family of silicones or of polyurethanes.

4. The external element as claimed in claim 1, wherein the thermochromic layer is an ink consisting of a binder chosen from the family of acrylics or of polyurethanes or of silicones, of a dispersant or defloculator of polycarboxylic-acid-salt type, of a Plasticizer and adhesion promoter of sulfonamide type and of a solvent chosen from the family of glycols or esters.

5. The external element as claimed in claim 1, wherein the protective layer is chosen from: sapphire glass, acrylic glass filled with nanodiamonds and graphene, a thin nanodiamond layer, and an acrylic lacquer filled with nanodiamond and graphene fillers, wherein the protective layer has a thermal conductivity at least higher than 10 $W \cdot m^{-1} \cdot K^{-1}$.

6. The external element as claimed in claim 1, wherein the carrier layer has a thermal conductivity higher than 100 $W \cdot m^{-1} \cdot K^{-1}$.

7. The external element as claimed in claim 1, wherein the carrier layer is made from a material chosen from: anodized aluminium, copper, gold alloys, silver alloys, aluminium/silicon carbide alloys, thin layers of nanodiamonds, thin layers of graphite, or graphene.

8. The external element as claimed in claim 1, further comprising a substrate on which the various layers are placed to form an insert.

9. The external element as claimed in claim 1, further comprising at least one intermediate layer arranged under the thermochromic layer.

10. The external element as claimed in claim 9, wherein the intermediate layer is a luminescent layer.

11. The external element as claimed in claim 1, wherein the device that reacts to temperature variations includes a temperature sensor including a plurality of thermochromic elements, each thermochromic element reacting to a specific temperature that is specific thereto.

12. The external element as claimed in claim 11, wherein the thermochromic elements all have a same first color.

13. The external element as claimed in claim 11, wherein the thermochromic elements all have a same second color.

14. The external element as claimed in claim 11, wherein the thermochromic elements are configured so that their second color allows a gradation when they have all passed from the first color to the second color.

15. The external element as claimed in claim 1, further comprising at least one recess arranged so that at least one thermochromic element can be placed therein.

16. A wearable object comprising:
- a case formed by a middle closed by a back and a glass;
- a strap;
- at least one external element according to claim 1 chosen from the middle, the glass, a bezel, a dial, the strap, and a clasp.

* * * * *